April 10, 1956 H. J. MELLOY 2,741,501
APPLIANCE KNOB SHAFT CONNECTION
Filed June 22, 1953
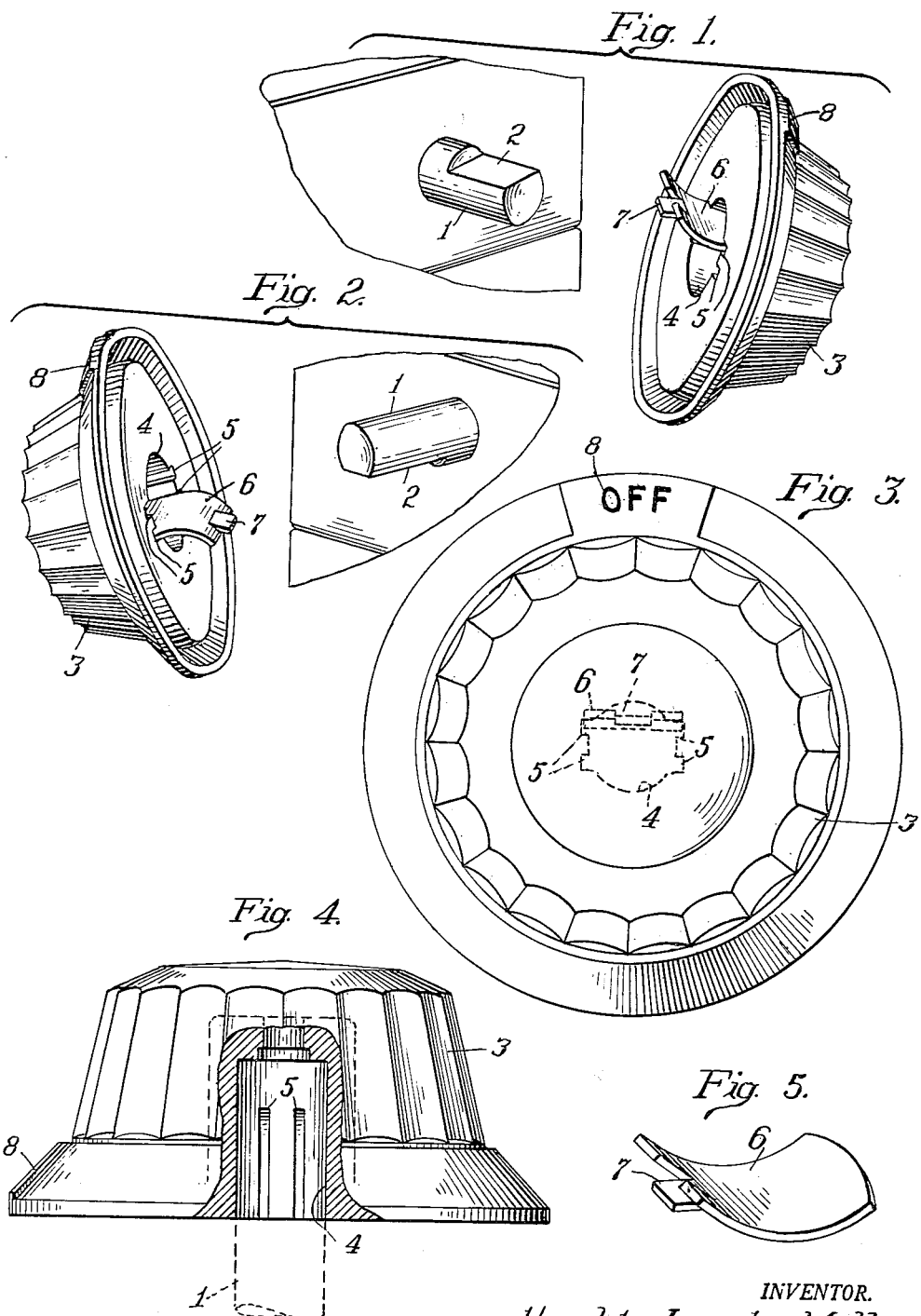
INVENTOR.
Harold Joseph Melloy
BY
ATTORNEYS United States Patent Office 2,741,501
Patented Apr. 10, 1956

2,741,501

APPLIANCE KNOB SHAFT CONNECTION

Harold Joseph Melloy, Knoxville, Tenn., assignor to The Patent Button Company of Tennessee, Inc., Knoxville, Tenn., a corporation of Tennessee Application June 22, 1953, Serial No. 363,221

3 Claims. (Cl. 287—53)

This invention relates to improvements in appliance knob shaft connections of the character used to secure control knobs to shafts of household appliances such as electric or gas stoves and the like.

Most appliance control shafts in use heretofore have been provided with a D-section on each shaft adapted to mount an appliance knob thereon for controlling the appliance. The D-section usually was formed by a flat portion on one side of the shaft at an end thereof, to which end the knob would be secured.

Ordinarily, the control shaft was installed in the appliance with the D-section in an "up" position or in a "down" position. With appliance knobs in use heretofore, it was necessary to locate the knob in a particular relation to the D-section in order to dispose the indicia on the knob in the proper relation for inspection, to indicate the condition of the appliance in that position of the knob as, for instance, "off," "on," etc. This required one form of knob to be used when the D-section was in an "up" position, for instance, and another form of knob when the D-section was in a "down" position. It was not possible to use the same knob for both types of mountings.

One object of this invention is to obviate these objections and to enable the use of identical shaft holes in the knobs to fit standard diameter shafts when the D-sections of the shaft are either in "up" or "down" relation to the indicia on the control, and thereby in "up" or "down" relation to the "off" or "on" position of the valve or other appliance control means.

A further object of the invention is to improve the mounting means for a control knob on a shaft to enable this to fit securely the D-section of the shaft in either of opposite positions of the knob relative thereto.

These objects may be accomplished according to one embodiment of the invention by providing a center section of the control knob with a shaft hole therein and means on respectively opposite sides of the center axis of the shaft hole for locking an anchoring member to the knob in either alternate position with respect thereto so as to secure the D-section of the shaft of the knob in either of said positions. This anchoring means preferably comprises a pair of grooves formed on each opposite side of the shaft hole arranged to receive selectively in a pair of said grooves an anchoring member, such as a spring member, that may be inserted therein in bearing relation to the D-section of the shaft so as to secure the knob therein frictionally in either standard position of the shaft. A flat leaf spring may be used for this purpose and has been found especially effective for anchoring the knob to the shaft.

This embodiment of the invention is illustrated in the accompanying drawings, in which:

Fig. 1 is a perspective view showing the relation of the knob to an appliance control shaft with the D-section of the shaft in the "up" position;

Fig. 2 is a similar view in which the D-section of the shaft is in the "down" position;

Fig. 3 is an end elevation of the appliance knob;

Fig. 4 is a side elevation thereof, partly in section; and

Fig. 5 is a perspective view of one of the anchoring springs.

Referring to Figs. 1 and 2, the invention is shown in connection with an appliance having a control shaft for a gas range, electric stove, or the like. The shaft is designated generally by the numeral 1 and the D-section is formed by a flat side 2 on the end thereof on which the appliance knob is adapted to be secured. In Fig. 1, the flat side is in an "up" position, while in Fig. 2 the shaft is reversed, with the flat side in a "down" position. The position thereof will depend upon the control in the appliance to which the shaft is attached. Usually some appliances have the flat side turned in one direction and in others it is turned in the opposite direction.

A control knob is shown generally at 3, having indicia 8 on one side of the top to designate a control point, usually indicating "Off" or "On," according to the position of the knob with respect to the appliance.

The invention may be applied to any suitable form of control knob as desired, but is shown as having a shaft hole 4 in the center thereof to receive the projecting end of the shaft 1 constituting the D-section thereof, which D-section may extend into the shaft hole 4 to any desired extent. Means are provided for securing the control knob 3 to the shaft 1 without regard to the position of the D-section of the shaft either up or down.

To accomplish this result, I have provided two pairs of spaced grooves 5 on opposite sides of the longitudinal axis through the shaft hole 4, the grooves of each pair being on opposite sides of a longitudinal plane through the axis, and the pairs of grooves being on opposite sides of a longitudinal plane through the axis at right angles to the first-mentioned plane, as shown in Figs. 1, 2 and 3.

I have provided also means for anchoring the D-section of the shaft 1 in the shaft hole 4. In this embodiment of the invention, this means comprises a bowed leaf spring of sufficient width to extend between the corresponding grooves of the respective pairs on the same side of the first-mentioned plane and to abut against the flat surface 2 of the shaft 1 to anchor the knob to the shaft. The spring 6 is bowed in a lengthwise direction so as to be inserted in transversely spaced grooves 5, as shown in Figs. 1 and 2, with the outer end thereof curved away from the axis of the shaft hole 4 in the knob to facilitate the introduction of the knob over the D-section of the shaft in a friction fit thereon, while the edges of the leaf spring 6 are anchored in the groove 5. The spring 6 should be of sufficient length to extend substantially throughout the length of the grooves, or at least throughout the major portion of the length thereof. An upwardly bent tongue 7 on one end of the leaf spring provides a means for limiting the depth to which the shaft can penetrate into the shaft hole. At the limit of shaft penetration the tongue 7 seats against the shoulder at end of flat side 2.

In applying the knob to the shaft of the appliance, the indicia 8 on the knob should be turned to its upper position, this being the normal control position of the knob to indicate a particular condition of the appliance, as when the control valve or switch is "Off" or "On." The pairs of grooves 5 are on opposite sides of a plane through the axis of the knob and through the indicia 8, whereby the leaf spring 6 extending between corresponding grooves of the respective pairs will be substantially at right angles to said plane.

When the knob is turned to this position, it may be secured to the D-section of the shaft either in an "up" position of the shaft or in a "down" position thereof, according to the disposition of the shaft in the appliance. When the flat side 2 is turned up, as shown in Fig. 1, the leaf spring 6 is inserted in the top grooves 5 of the respective pairs of grooves, as indicated in Fig. 1, and the knob is pushed over the end of the shaft, the flat side bearing against the convex face of the leaf spring 6. If the flat side of the D-section of the shaft is at the bottom of the shaft, as in Fig. 2, the leaf spring is inserted in the lowermost grooves 5 extending between opposite pairs of grooves, with the indicia 3 at the top or other control position, and the knob then may be inserted over the end of the shaft, as will be apparent from Fig. 2. In either position, the leaf spring holds the knob frictionally on the shaft in a secure relation thereto and provides a control for the shaft, which enables the shaft to be turned to the required extent for regulating or controlling the appliance.

It will be apparent that a shaft hole formed in this manner will provide for an effective securing of an appliance knob to a standard diameter shaft of an appliance in which the D-section of the shaft, in its normal position, is either up or down with relation to the "Off" or "On" position of the shaft, or other control position thereof. Thus it will be unnecessary to provide special forms of shaft holes for the respective control shafts, one for use when the D-section is up and the other for use when the D-section is down.

While the invention has been illustrated and described in one embodiment thereof, it is recognized that variations and changes may be made therein without departing from the invention as defined in the claims.

I claim:

1. An appliance control knob comprising a body having a shaft hole therein adapted to receive a D-section of a shaft end and to be secured thereto, said body having wall sections at opposite sides of the hole with arcuate wall portions connecting the wall sections on opposite sides of the axis of the hole and spaced equi-distant from said axis, each of the wall sections having a pair of grooves therein on opposite sides of a transverse plane through the axis, and an anchoring member extending selectively in bridging relation between two of said grooves and into said grooves on the same side of said plane.

2. An appliance control knob comprising a body having a shaft hole therein adapted to receive a D-section of a shaft end and to be secured thereto, said body having wall sections at opposite sides of the hole with arcuate wall portions connecting the wall sections on opposite sides of the axis of the hole and spaced equi-distant from said axis, each of the wall sections having a pair of grooves therein on opposite sides of a transverse plane through the axis, the grooves of each pair on the same side of said transverse plane having open sides facing toward each other in opposed coacting relation, and an anchoring member extending selectively in bridging relation between two of said grooves and into said grooves on the same side of said plane.

3. An appliance control knob comprising a body having a shaft hole therein adapted to receive a D-section of a shaft end and to be secured thereto, said hole having two pairs of grooves spaced from respectively opposite sides of a transverse plane through the axis of the hole, the grooves of each pair having open sides facing toward each other, and a leaf spring extending selectively in bridging relation between the grooves of one pair on the same side of said plane for securing the knob on the D-section of the shaft.

References Cited in the file of this patent
UNITED STATES PATENTS

| | | |
|---|---|---|
| 1,815,165 | Scofield | July 21, 1931 |
| 1,903,457 | Holstein | Apr. 11, 1933 |
| 1,923,691 | Schornstein | Aug. 22, 1933 |
| 1,998,649 | Arden | Apr. 23, 1935 |
| 2,291,995 | Tinnerman | Aug. 4, 1942 |